United States Patent
Geelen

(10) Patent No.: US 10,175,057 B2
(45) Date of Patent: Jan. 8, 2019

(54) NAVIGATION DEVICE AND METHOD

(75) Inventor: Pieter Geelen, Amsterdam (NL)

(73) Assignee: TOMTOM NAVIGATION B.V., Amsterdam (NL)

(*) Notice: Subject to any disclaimer, the term of this patent is extended or adjusted under 35 U.S.C. 154(b) by 0 days.

(21) Appl. No.: 13/806,234

(22) PCT Filed: Jun. 22, 2010

(86) PCT No.: PCT/EP2010/058826
§ 371 (c)(1),
(2), (4) Date: Mar. 15, 2013

(87) PCT Pub. No.: WO2011/160677
PCT Pub. Date: Dec. 29, 2011

(65) Prior Publication Data
US 2013/0218453 A1    Aug. 22, 2013

(51) Int. Cl.
*G01C 21/34*    (2006.01)
*G01C 21/36*    (2006.01)

(52) U.S. Cl.
CPC ..... *G01C 21/3461* (2013.01); *G01C 21/3626* (2013.01)

(58) Field of Classification Search
None
See application file for complete search history.

(56) References Cited

U.S. PATENT DOCUMENTS

| | | | |
|---|---|---|---|
| 5,842,146 A | 11/1998 | Shishido | |
| 6,278,935 B1* | 8/2001 | Kaplan | G01C 21/26 235/384 |
| 7,634,356 B2 | 12/2009 | Oguchi et al. | |
| 2003/0023376 A1* | 1/2003 | Fujimoto | G01C 21/367 701/455 |
| 2004/0088103 A1* | 5/2004 | Itow | B60K 6/485 701/110 |

(Continued)

FOREIGN PATENT DOCUMENTS

| | | |
|---|---|---|
| CN | 1969169 A | 5/2007 |
| DE | 102006000926 A1 | 7/2007 |

(Continued)

OTHER PUBLICATIONS

International Search Report issued Jun. 1, 2011 for International Application No. PCT/EP2010/058826.

*Primary Examiner* — Navid Ziaeianmehdizadeh

(57) ABSTRACT

A navigation device that can access map data and avoidance data, the avoidance data including information for identifying undesirable locations, receive location information representing a geographical location and direction of travel in relation to the map data; and establish, based on the location information and map data, whether the geographical location and direction of travel approach a navigation decision point having a plurality of navigation choices, where each navigation choice corresponds to an onward route leaving the navigation decision point; determine, based on the map data and avoidance data, for at least one onward route leaving the navigation decision point, whether the onward route unavoidably includes an undesirable location; and provide result information to the output section based, at least in part, on the determination.

16 Claims, 12 Drawing Sheets

(56) References Cited

U.S. PATENT DOCUMENTS

| | | | | |
|---|---|---|---|---|
| 2004/0215389 | A1* | 10/2004 | Hirose | G01C 21/3461 |
| | | | | 701/410 |
| 2005/0107951 | A1* | 5/2005 | Brulle-Drews | G01C 21/3461 |
| | | | | 701/533 |
| 2006/0129315 | A1* | 6/2006 | Kanematsu | 701/210 |
| 2008/0120021 | A1 | 5/2008 | Masaki et al. | |
| 2009/0248292 | A1 | 10/2009 | Hajime et al. | |
| 2013/0211705 | A1* | 8/2013 | Geelen et al. | 701/410 |

FOREIGN PATENT DOCUMENTS

| | | |
|---|---|---|
| EP | 1484581 A2 | 12/2004 |
| EP | 1760432 A2 | 3/2007 |
| EP | 1806561 A1 | 7/2007 |
| JP | 11287667 A | 10/1999 |
| JP | 2006098143 A | 4/2006 |
| JP | 2007064914 A | 3/2007 |
| JP | 2007114008 A | 5/2007 |
| WO | 2007114015 A1 | 10/2007 |
| WO | 2010007668 A1 | 1/2010 |

\* cited by examiner

100

NAVIGATION DEVICE AND METHOD

CROSS-REFERENCES TO RELATED APPLICATIONS

This application is the National Stage of International Application No. PCT/EP2010/058826, filed Jun. 22, 2010 and designating the United States. The entire content of this application is incorporated herein by reference.

FIELD OF THE INVENTION

This invention relates to navigation devices, systems and methods. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning and/or navigation functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

When a route to a destination is calculated before starting a journey, it is possible to inform the user of any undesirable locations that may be encountered on the route. Examples of undesirable locations are toll-roads, low bridges, narrow roads, roads with a weight limit, etc. The user may then be able to select whether to accept that route, or use an alternative route. However, when free-driving the device does not know where the user intends to drive to, and so cannot inform the user, in advance, of an undesirable location by checking for undesirable locations on a pre-calculated route.

When following a route pre-calculated route, the user's tolerance for undesirable locations may change during the journey; a toll road may become more desirable if the user is behind schedule, for example. Accordingly, the user may wish to defer the decision of whether or not to avoid an undesirable location. In some cases, a location may become undesirable after the route was initially calculated, such as a toll-road which is free at certain times. In such cases the time of arrival at the location may affect whether or not it is undesirable or the degree to which it is undesirable; the actual time of arrival at the location could be very different to the expected time of arrival when the route was initially calculated.

Planned road tax schemes in some European countries are likely to increase the demand for information on undesirable locations to be provided to the user, and may increase the complexity of what is considered an undesirable location. In the Netherlands, for example, it is planned that vehicles will be tracked using GPS, and taxed based on the vehicle type, usage, roads that are used, and the time at which the vehicle is driven. In particular, the amount of tax will become dependent on routes taken and the time at which the routes are used. Accordingly, roads that are expensive to use will become less desirable. In some cases the cost will be time-dependent. Current devices do not address the user's needs with respect to such route-planning challenges.

It is an aim of the present invention to address one or more of the above problems.

SUMMARY OF THE INVENTION

In pursuit of this aim, an aspect of the present invention provides a navigation device comprising: a processing section (520); and an output section (530) for providing an output responsive to the processing section; wherein the processing section (520) has access to map data (540) and avoidance data (550), the avoidance data (550) including information for identifying undesirable locations, and the processing section (520) is arranged to: receive location information representing a geographical location and direction of travel in relation to the map data (540); and establish, based on the location information and map data (540), whether the geographical location and direction of travel approach a navigation decision point having a plurality of navigation choices, where each navigation choice corresponds to an onward route leaving the navigation decision point; determine, based on the map data (540) and avoidance data (550), for at least one onward route leaving the navigation decision point, whether the onward route unavoidably includes an undesirable location; and provide result information to the output section (530) based, at least in part, on the determination.

The onward route may be determined to unavoidably include an undesirable location if, along the onward route, an undesirable location is reached before a next navigation decision point.

The onward route may be determined to unavoidably lead to an undesirable location if, along the onward route, all subsequent routes from subsequent navigation decision points include an undesirable location.

The processing section may perform the determination for either: each onward route from the approached navigation decision point, an onward route from the approached navigation decision point corresponding to a continuation of a route by which the decision point is approached, an onward route from the approached navigation decision point, the onward route along a pre-planned route.

The avoidance data may identify as undesirable at least one of toll roads, taxable routes, a congestion charging zone, routes with height restrictions, routes with width restrictions and routes with weight restrictions.

The navigation device may be arranged to receive time data representative of at least one of a current time or an expected time at which an undesirable location will be reached, and wherein: the avoidance data is time-dependent, and the processing section performs the determination based, at least in part, on the time data.

The processing device may investigate whether a degree to which an undesirable location is undesirable will change within a predetermined time period, and at least one of: the result of this investigation may be used in the determination of whether the onward route unavoidably includes an undesirable location, and the result information provided to the output section may include the result of this investigation.

The result information may include a recommendation to wait in order to reduce the degree to which an undesirable location is undesirable.

The output from the output device may include a route or directions for avoiding the undesirable location.

In some embodiments at least one of routes from a navigation decision point that double-back on an approach to the decision point, routes from a navigation decision point that re-trace an approach to a decision point, or routes from a navigation decision point that form a closed loop, are not considered by the processing section to be onward routes from the decision point when performing the determination.

The output from the output device may include a warning based on the result information received from the processing section.

The navigation device may include a positioning device, the positioning device arranged to determine the location information, the location information being representative of the geographical location and direction of travel of the positioning device.

The navigation device may be a server, the location information being received from a remote device.

Another aspect of the invention provides a system comprising: a navigation device; and the remote device, the remote device being a positioning device arranged to determine the location information, the location information being representative of the geographical location and direction of travel of the positioning device.

Another aspect of the invention provides a machine-implemented navigation method comprising: receiving location information representing a geographical location and direction of travel; establishing, based on the location information, whether the geographical location and direction of travel approaches a navigation decision point having a plurality of navigation choices, where each navigation choice corresponds to an onward route leaving the navigation decision point; accessing information for identifying undesirable locations; determining, based on the information for identifying undesirable locations, for at least one onward route leaving the navigation decision point, whether the onward route unavoidably includes an undesirable location; and outputting result information responsive to the determination.

According to another aspect, a navigation device comprises: a storage section arranged to store map data and cost data, the cost data including information for evaluating a cost of routes defined relative to the map data based on a cost function; a processing section having access to the data stored by the storage section; and an output section arranged to provide output based on a determination by the processing section, wherein the cost data includes time-dependent cost data, the time-dependent cost data changing depending on the time at which a corresponding route is to be followed, the processing section is arranged to: receive a start position, a start time and a route relative to the map data, determine at least one of: whether a cost for the route can be reduced by waiting, or whether a cost associated with a route portion would be increased by waiting before reaching the route portion, and control the output of the output section based on the determination.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

References herein to sections or modules are not intended to be particularly limiting, and the functionality attributed to such a module or section could be provided by a plurality of components. Similarly, an individual component may provide, or contribute to, the functionality of a number of sections and/or modules. The various sections and modules may be implemented in hardware, software or a combination of the two. Unless the context requires otherwise, the various sections or modules may be provided at different locations, and individual modules may be distributed between a number of locations.

References to data or information being stored include storage by mass storage devices (such as optical discs and magnetic discs) or active memory (such as RAM). References to data or information "stored at", or "at" is used as a shorthand for "accessible to", and does not imply a physical location of the storage, unless the context demands otherwise.

In the following description, various embodiments of the invention are described. It would be clear to the skilled man that the features of these embodiments could be combined in various ways without undue experimentation.

Figure 1:
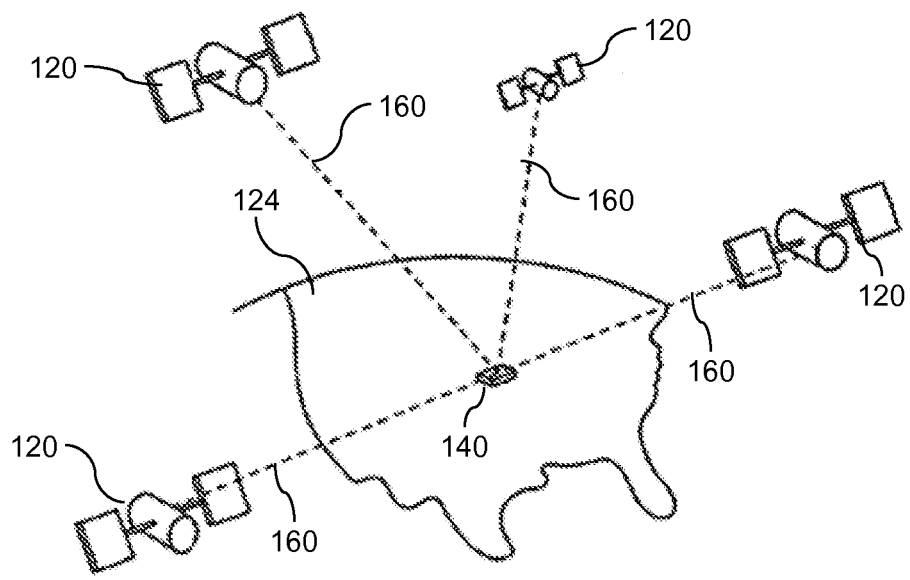
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
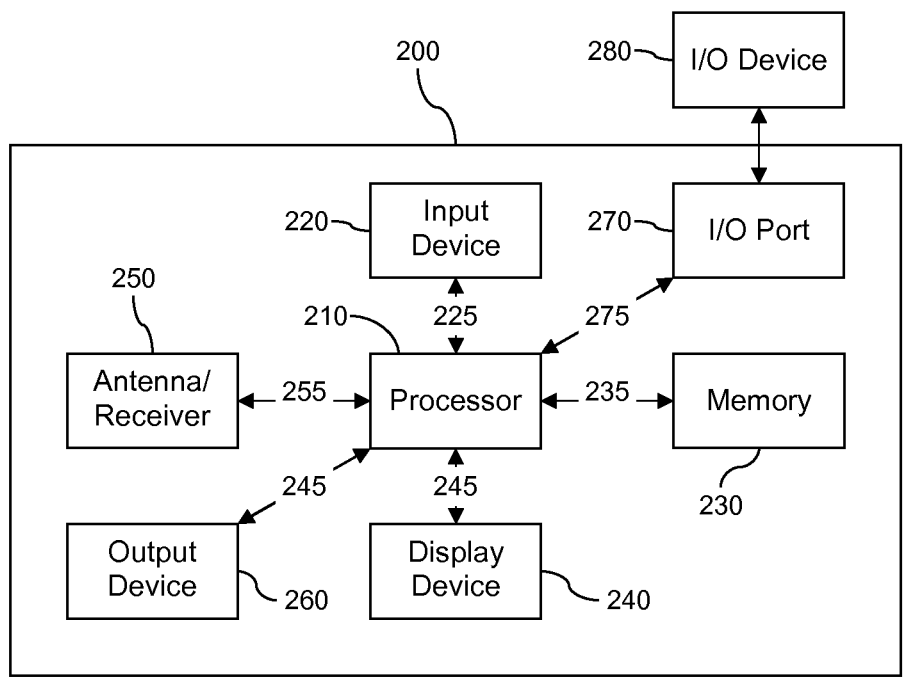
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
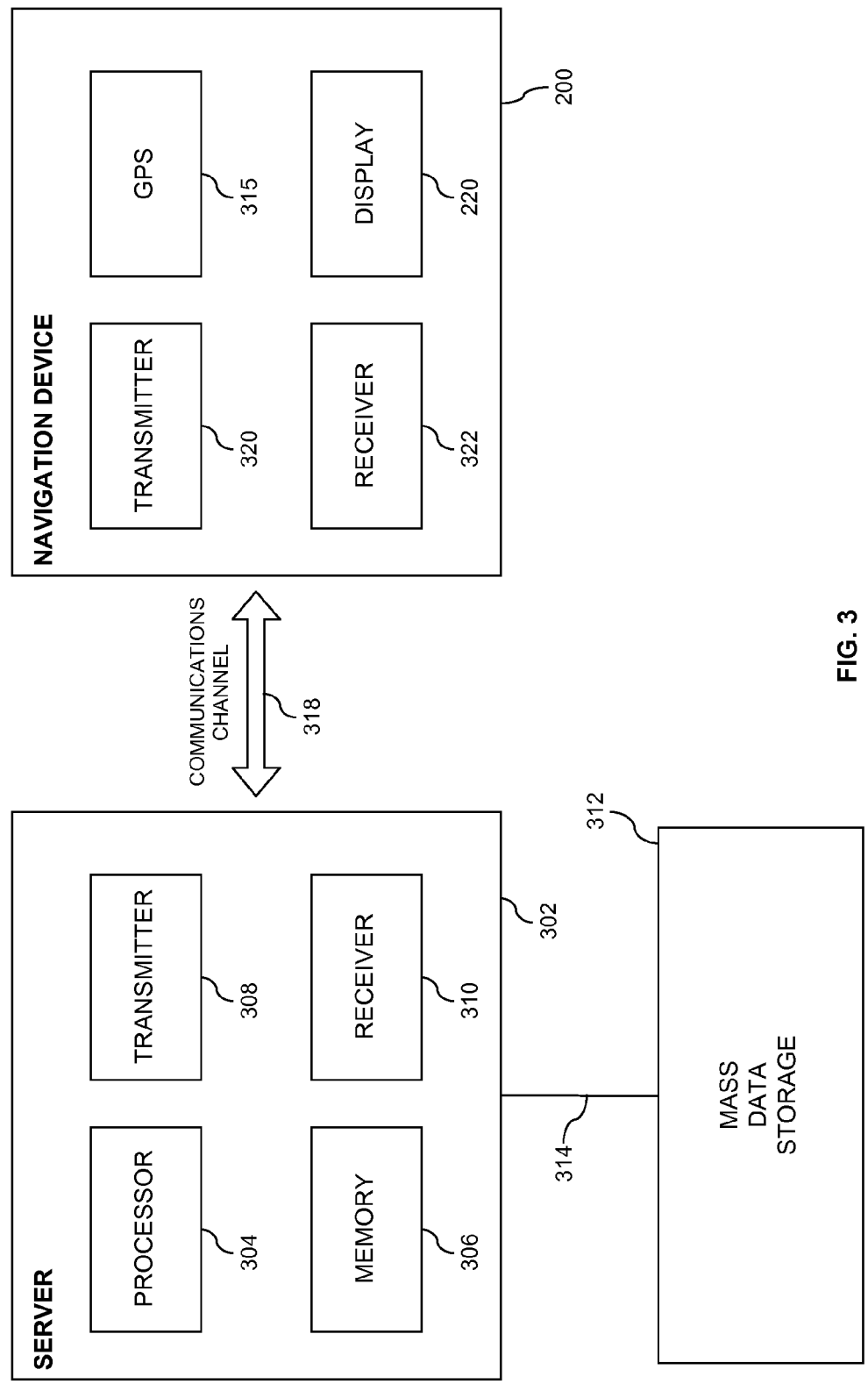
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
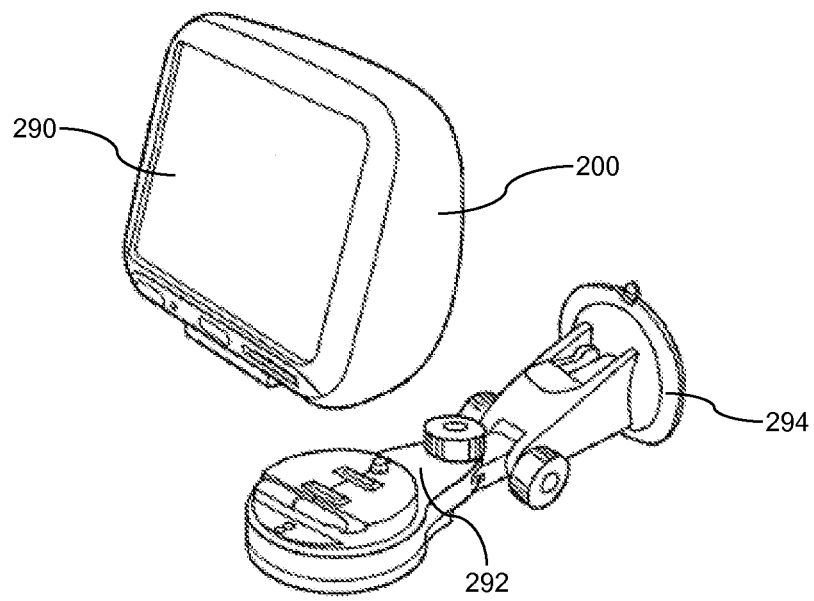
FIGS. 4a and 4b are illustrative perspective views of a navigation device.
Figure 4B:
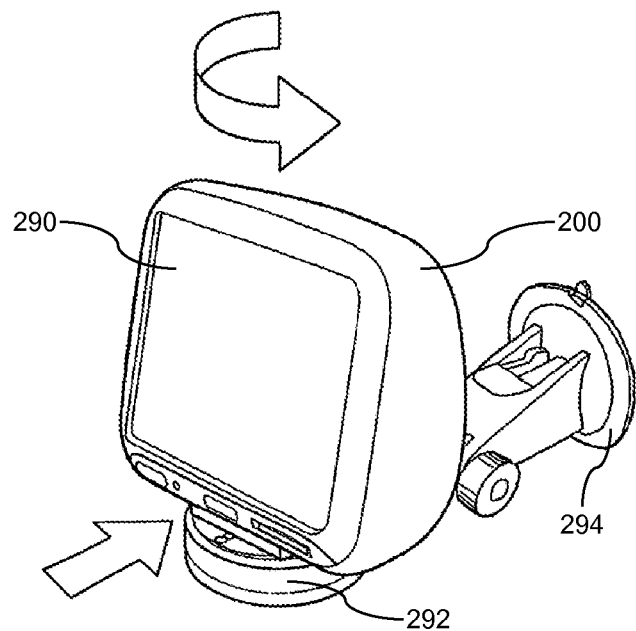

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Determination of Undesirable Routes

Figure 5:
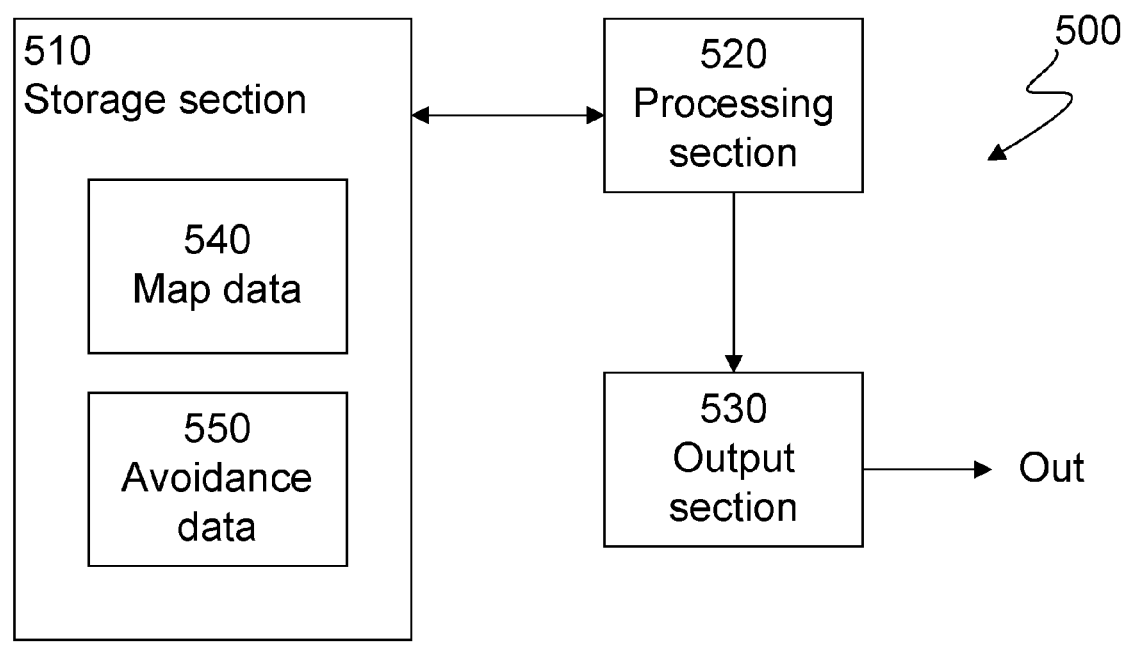
FIG. 5 shows a navigation device according to an embodiment of the present invention.

FIG. 5 shows a navigation device 500 according to an embodiment of the present invention. The navigation device 500 has a storage section 510 for storing data including map data 540 and avoidance data 550. In some embodiments the map data 540 and the avoidance data 550 can be combined. The navigation device also includes a processing section 520 that has access to (is in informational communication with) the storage section 510. The processing section 520 communicates with the output section 530, and the output section 530 performs output based on a result communicated from the processing section. The navigation device 500 could be provided in or implemented in a PND, or could be provided in a server. Where the navigation device is provided in a PND, the processing section 520 may be embodied by processor 210. GPS section 315 acts as a positioning device, and determines location information, including its position and direction. The processing section 500 receives the location information from GPS section 315, and based on the map data 540 and the location information determines whether it is appropriate to inform the user of an undesirable location (herein, the user is assumed to be travelling with the positioning device, and to have the same location information). The determination may be based on preference information stored in the storage section 510. If it is determined that the user should be informed, the processing section 520 causes the output section 530 to inform the user accordingly. The output section 530 may be output device 260 or display device 240. Additionally or alternatively, the output device could be I/O port 270.

When navigation device 500 is included in a server, the storage section 510 may be implemented by mass data storage 312, the processing section 520 implemented by processor 304, and the output section implemented by transmitter 308. The processor receives location information from a PND via communications channel 318 and receiver 310, and based on the map data 540, avoidance data 550 and the location information, determines whether it is appropriate to inform the user of an undesirable location. The determination may be based on preference information stored in the storage section 510 or provided via communications channel 318 and receiver 310. If it is determined that the user should be informed, the processor 520 causes the output section 530 to transmit information via the transmitter 308 to cause the PND to inform the user. Normally, the PND will inform the user visually and/or aurally. The output from the PND may be in the form of a warning.

The map data includes a plurality of decision points. A decision point is any point where a user will be presented with one or more routes (onward routes) leading away from the decision point, one of which must be selected to continue the journey. Under normal driving conditions, it is often possible for the user to alter the route by performing a manoeuvre, such as a U-turn or a three-point turn (herein manoeuvre denotes a movement that departs from the regular flow of traffic). When the processor determines the available onward routes, the results of such manoeuvres are not considered by the processor, that is are not considered to be "onward routes", unless specifically allowed for in the map data.

Figure 6:
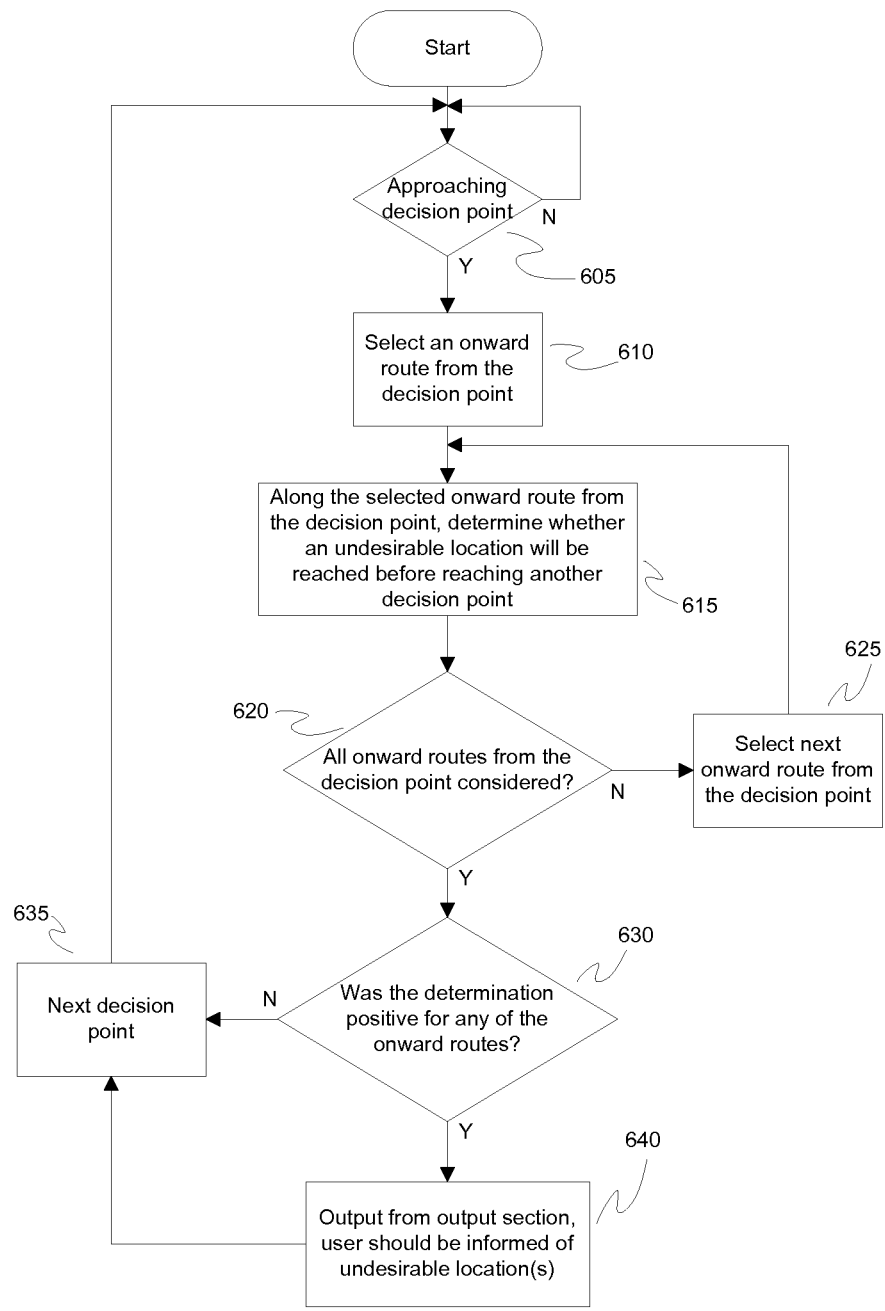
FIG. 6 shows a method performed by a navigation device according to an embodiment of the present invention.

FIG. 6 shows a method performed by the processing section 520 of the navigation device 500 of this embodiment. The information on the position and direction of motion of the positioning device are provided to the processing section 520, which determines (step 605), based on the map data 540, whether the positioning device is approaching a decision point. A decision point may be considered to be approached if the positioning device is moving toward the decision point and is less that a pre-set distance from the decision point. Alternatively, where the positioning device determines its velocity and provides this to the processing section, a decision point may be considered to be approached if the positioning device will arrive at the decision point within a pre-set time, assuming its current speed is maintained. A combination of these criteria, or other criteria may be used. The determination may depend on the type of road, for example a look-up table could be used to determine the pre-set distance and/or time depending on whether the current road is a single carriageway, dual carriageway, motorway, etc. A decision point that is determined to be approached by the processing section is referred to herein as an approached decision point.

When the processing section determines that a decision point is approached, one of the onward routes leaving the decision point is selected (step 610). The processing section then determines (step 615) whether, along this route, an undesirable location will be reached before a decision point, such a route is termed an "undesirable route" in relation to this embodiment. The determination in step 615 is repeated for each onward route from the approached decision point until all onward routes have been considered. According to the present embodiment, this is achieved by determining whether all onward routes from the approached decision point have been considered (i.e. subjected to the determination according to step 615). If any onward routes have not yet been considered, step 625 selects a route from the route or routes that have not been considered and returns to step 615, where the determination is carried out for this route. If, at step 620 it is determined that all of the onward routes have been considered, the processing section determines whether any of the onward routes from the approached decision point were determined to be undesirable onward routes. If none of the onward routes are determined to be undesirable, the next decision point is considered at step 635.

In one embodiment, on reaching step 635, the processing section waits until the approached decision point has been passed, and then returns to step 605, where it is determined whether another decision point is being approached. Waiting until the approached decision point has passed at step 635 avoids repeating the process (steps 605 to 640) for the same decision point, reducing unnecessary load on the processing section. In this case only the closest decision point along the direction of travel is considered to be "approached".

In one embodiment, on reaching step 635, if the approached decision point has not been passed, processing returns to step 605 (or step 610), and the process (steps 610 to 630) repeated for the same decision point. This can be advantageous when the avoidance data is time-dependent and there is a possibility that the result of the determinations in steps 615 may change. The processing section may continually repeat steps 610 to 630, or repeat steps 610 to 630 after a time delay. The processing section may determine whether or not to repeat steps 610 to 630 based on factors such as whether the avoidance data is time-dependent (particularly the avoidance data relating to any undesirable locations relevant in step 615), and the expected time before the next decision point will be reached. In this embodiment, the navigation device may be provided with a time section, to provide time information (such as the current time) to the processing section. Alternatively, the time information may be provided by an external source.

If any (one or more) of the onward routes are determined be undesirable (i.e. to reach an undesirable location before reaching a decision point), step 640 provides an appropriate output to the output section. Where the navigation device is a PND, the output section may provide an audible and/or visible warning to caution the user that, at the next decision point, one or more of the onward routes lead to an undesirable area. The warning may specify which onward routes are undesirable, and the type of undesirable location associated with each of the undesirable routes. Where the navigation device is a server, the output section provides a result to the device associated with the positioning device. The result may indicate simply that one or more onward routes from the approached decision point are undesirable, so the user can be cautioned. In this case, step 620 may be replaced by "undesirable route found or all onward routes considered?"

since it is not necessary to continue checking for undesirable routes after one is found. However, preferably, the result indicates the undesirable routes and the type of undesirable location so that this information can be made available to the user.

According to the above embodiment, the user is made aware that, at the next decision point, there is a risk of taking an undesirable route, which would unavoidably (in the absence of a manoeuvre) lead to an undesirable location. This provides the user with a timely warning, since the approached decision point provides at least one route that does not lead directly to an undesirable location. By informing the user when the decision point is approached, the warning is fresh in the user's mind, and the user is able to easily associate the warning to the decision point. In contrast, a warning delivered when the route is initially planned may be forgotten, or a user may not realise that the area where the warning is relevant has been reached. In addition, the present embodiment may provide warning to caution a user even when a planned route does not follow the undesirable route. This allows the user to exercise additional care when selecting an onward route from the decision point.

The present embodiment is particularly advantageous when the user is free driving. When free driving the route is not planned, and navigation device does not have information on the route the user will follow. Accordingly, it is not possible to provide warnings about undesirable locations before the journey (e.g. at a route-planning stage).

Figure 7:
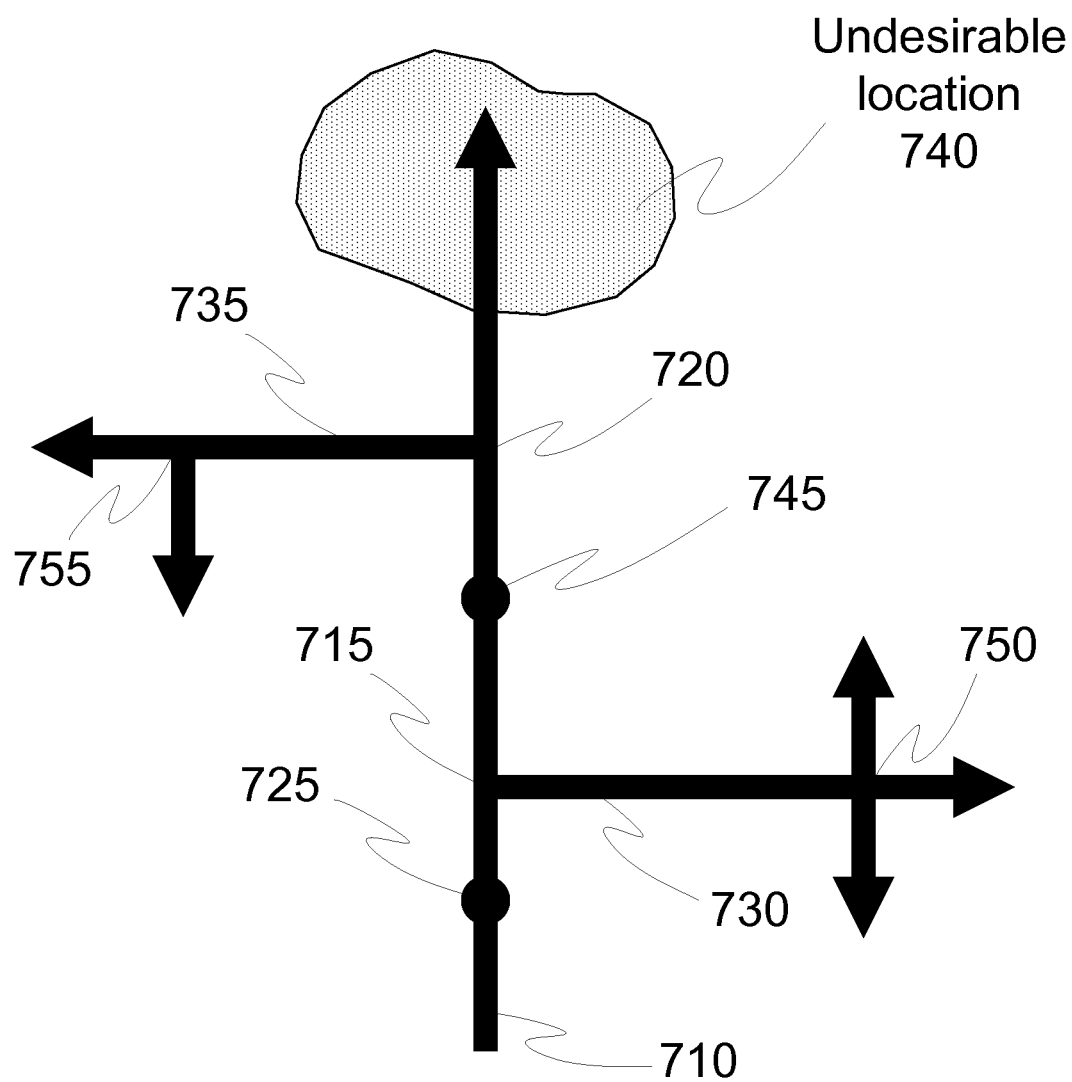
FIG. 7 shows an example road network for illustrating the method of FIG. 6.

FIG. 7 shows an example road network including a main road 710 with two junctions, 715 and 720, which are navigation decision points. When a user is travelling from point 725 toward to top of figure along main road 710, junction 715 is arrived at first, and here it is possible to continue on the main road or turn right onto road 730. Road 730 leads to junction 750. Continuing along the main road from junction 715 leads to junction 720, where it is possible to continue along the main road or turn left onto road 735, which leads to junction 755. From junction 720, continuing along the main road leads to an undesirable location 740, such as a toll bridge. The main road continues beyond the top edge of the figure. The map data includes information on the roads shown in FIG. 7, and on the avoidance data includes information on the undesirable location.

When a user is at point 725, travelling toward junction 715 (a decision point), the processing section will determine that junction 715 meets the criteria for an approached decision point (step 605) before the user reaches junction 715. The processing section then selects an onward route from the decision point (step 610), for example continuing along road 710. At step 615 it is determined that continuing on road 710 is not an undesirable onward route, as along this route the decision point 720 is reached before reaching any undesirable location. As the route along road 730 has not been considered, step 620 returns "No", and at step 625 the route along road 730 is selected (the only onward route that has not yet been selected). Step 615 determines that this route is not an undesirable route as junction 750 is arrived at before an undesirable location. As all onward routes from junction 715 have been considered, step 620 returns "Yes" and the method proceeds to step 630. None of the onward routes were determined to be undesirable, and so processing continues to step 635. After passing junction 715 and continuing on main road 710, the processing section begins checking, at step 605, whether a decision point is approached. In the present example, when the user reaches point 745, junction 720 meets the criteria for an approached decision point. The method then proceeds to step 610, where the onward route from junction 720 along main road 710 is selected. As there is no decision point between junction 720 and the undesirable location 740, the route from junction 720 along road 710 is determined at step 615 to be an undesirable route. As the route along road 735 has not been considered, processing returns to step 615, via steps 620 and 625. As road 735 leads to junction 755 without reaching an undesirable location, this route is determined not to be undesirable at step 615, and as all routes have now been considered, processing continues to step 630. At step 630, since at least one route was determined to be undesirable, the user is warned at step 640. Processing then returns to step 635, to wait until junction 720 has been passed.

In a variation of the embodiment of FIG. 6, step 610 selects an onward route corresponding to the user remaining on their current route through the decision point. For example, on a major road where the decision point corresponds to a turnoff to a minor road, the current route would correspond to remaining on the major road. Where the current road does not continue beyond the decision point, such as at a T-junction, all onward routes or no onward routes may be considered. In this variation, only the current route is considered in step 615, and step 630 follows step 615 (skipping step 620). This variation provides a warning to the user only if the undesirable location will be reached by continuing along the current route beyond the decision point. This may be more appropriate when the user is unlikely to deviate from the current route, and warnings about side-routes may cause annoyance. A similar variation may be suitable when the user is following a pre-planned route (either determined by the navigation device or provided to the navigation device by the user). In this case, it may be desirable only to determine whether the onward route corresponding to the pre-planned route leads to an undesirable location, since other routes might be considered to be irrelevant by the user. When a pre-planned route is followed, the warning that an undesirable location is approached may be suppressed if the final destination is within the undesirable location, or if the final destination cannot be reached without passing through the undesirable location.

In some embodiments, where the avoidance data is time dependent, when determining whether an undesirable location will be reached along an onward route, the processing section may estimate a time at which the undesirable location will be reached if that route is followed and, for that undesirable location, use the avoidance information corresponding to the estimated time when determining whether the onward route is undesirable. For example, if the current time is 1:45 am a toll road is about 30 minutes travel away, and the toll road is free overnight, from 2 am for example, the processing section would use the avoidance data for the toll road corresponding to 2:15 am (the expected time of arrival), and the toll road would not be considered an undesirable location.

Alternative Determination Undesirable Routes

Figure 8:
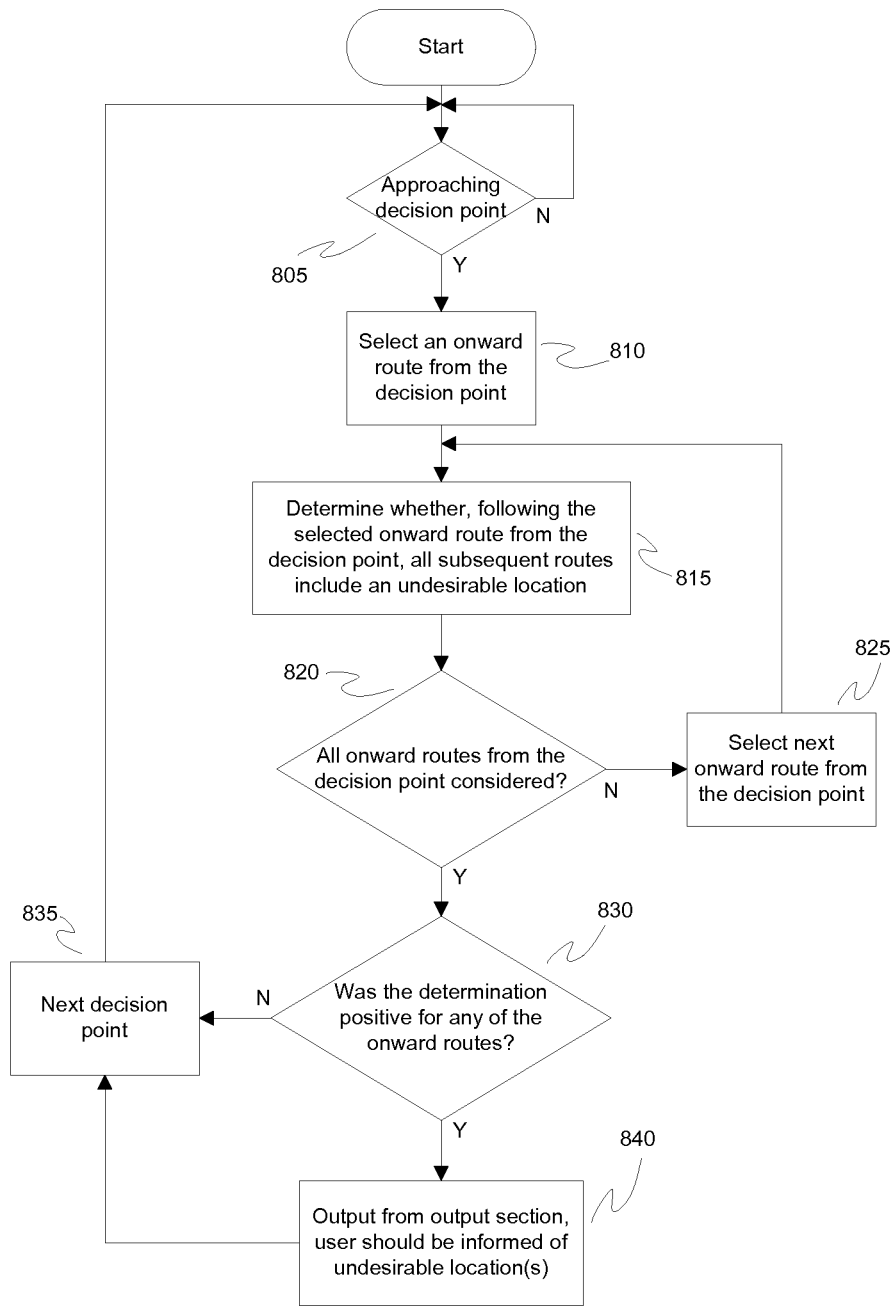
FIG. 8 shows a method performed by a navigation device according to another embodiment of the invention.

FIG. 8 shows an alternative method that may be performed by a processing section 520 according to an embodiment. Steps 805, 810, 820, 825, 830, 835 and 840 correspond respectively to steps 605, 610, 620, 625, 630, 635 and 640 described in relation to FIG. 6. Step 815 differs from step 615. In step 815, the processing section determines whether, along the selected onward route, all subsequent available routes include (reach) an undesirable location. According to the embodiment of FIG. 8, an undesirable route can be defined as one that leads directly to an undesirable location or only leads to undesirable routes.

In some cases, all routes away from a road junction may lead to an undesired location (or undesired locations). In such cases, the road junction does not provide a chance to avoid the undesired location(s), and the last chance would correspond to an earlier junction (decision point). According to this embodiment, warnings or information on undesirable locations may be provided before reaching the last chance to avoid the undesirable location. This ensures that the warnings or information are provided in a timely manner.

Figure 9:
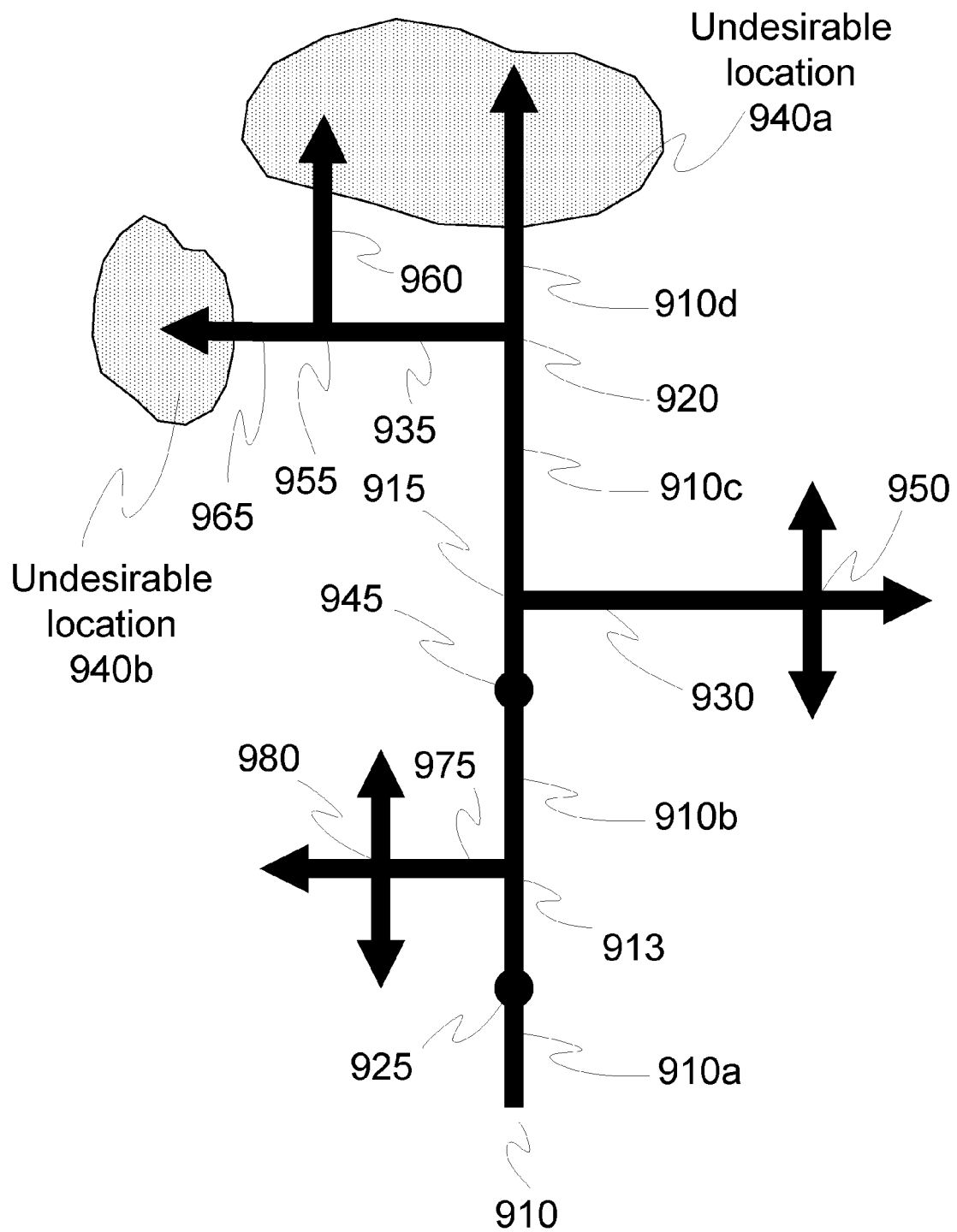
FIG. 9 shows an example road network for illustrating the method of FIG. 8.

FIG. 9 shows a road network having a main road 910 with three junctions, 913, 915 and 920, which are navigation decision points. When a user is travelling from point 925 toward to top of figure along main road 910, junction 913 is arrived at first, and here it is possible to continue on the main road or turn left onto road 975. Road 975 leads to junction 980, and for the purposes of this example, none of the routes leaving junction 950 lead to undesirable locations. Continuing along the main road 910, the next junction arrived at is junction 915, where it is possible to continue on the main road or turn right onto road 930. Road 930 leads to junction 950, and the routes leaving junction 950 do not lead to undesirable locations. Continuing along the main road from junction 915 leads to junction 920, where it is possible to continue along the main road or turn left onto road 935, which leads to junction 955. Turning right (towards the top of the figure) at junction 955 onto road 960 leads directly to undesirable location 940a, which may be a congestion charging zone, for example. Continuing at junction 955 towards the left of the figure, along road 965, leads to undesirable location 940b, which may be a toll bridge or a narrow road, etc. From junction 920, continuing along the main road toward the top of the figure also leads to undesirable location 940a.

From the point of view of a user on road 910, travelling towards the top of the figure, the portion of road 910d is an undesirable route, since it leads directly to undesirable location 940a. Similarly the routes along roads 960 and 965 travelling away from junction 955 are undesirable routes as they lead directly to undesirable locations. The route travelling along road 935 from junction 920 to junction 955 is also an undesirable route, since the only onward routes from junction 955 are undesirable routes (along roads 960 and 965). The route along road 910c from junction 915 is an undesirable route, since all routes from junction 920 (along roads 910d and 935) are undesirable routes. The route from junction 915 along road 930 does not lead to an undesirable location, and the subsequent routes from junction 950 are also not undesirable, so this route along road 930 is not undesirable. The route from junction 913 along road 910b is not undesirable, since not all routes from junction 930 are undesirable. Similar reasoning indicates that the route along road 975 from junction 913, and the route along 910a to junction 913 are not undesirable.

In the case of a user is at point 925, travelling toward junction 913 (a decision point) the processing section will determine, before the user reaches junction 913, that junction 913 meets the criteria for an approached decision point (step 805). The processing section then selects an onward route from the decision point (step 810), road 975, for example. At step 815 it is determined that road 975 is not an undesirable route (for reasons described above). Processing then returns to step 815, via steps 820 and 825, to consider whether continuing along road 910b is an undesirable route. As described above, road 910b is not undesirable.

In determining whether the route along road 910b is undesirable, step 815 may consider all possible routes continuing from the selected route (for example by considering whether roads 930, and 910c are undesirable, which would require consideration of each of the roads leaving junction 950, as well as roads 910d, 935, 960 and 965). Alternatively, step 815 may stop when any route leading from junction 915 is found not to be undesirable. For example, if the route along road 930 is considered first and found to be not undesirable, step 815 may stop without considering the route along road 910c (avoiding the need to consider roads 910c, 910d, 935, 960, 965). In this manner step 815 determines whether there is at least one route continuing on from the selected route (selected in step 810 or 825) that does not arrive at an undesirable location, which ensures that if the selected route (selected in step 810 or 825) is followed, the approached decision point is not the last opportunity to avoid an undesirable location(s).

Having concluded that the route along 910b is not undesirable, processing continues to step 820, where it is determined that all onward routes have been considered and processing moves to step 830. As neither of the routes along roads 975 and 910b were undesirable, processing continues step 835.

When the user has passed the decision point (junction 913), processing returns to step 805, and before the user reaches junction 915 the processing section determines that junction 915 is an approached decision point. Step 810 then selects an onward route from junction 915, for example along road 930. Road 930 is not undesirable, so the result in step 815 is negative. Via steps 820 and 825, the process returns to step 815 with the route along 910c as the selected route. This route is determined in step 815 to be undesirable, and processing proceeds, via step 820 to step 830. As at least one of the onward routes (along road 910c) was determined to be undesirable, the output section performs an appropriate output (step 840) and the method advances to step 835.

According to this method, at point 945 the user will be warned that junction 915 is the last opportunity to avoid the undesirable location(s), since even though there are further decision points, all of these have been determined to lead unavoidably to undesirable locations. On the other hand, this warning is not issued when the user is at point 925, since junction 913 is not the last opportunity to avoid the undesirable locations (junction 915 providing a subsequent opportunity).

It should be understood that the user may be warned (or otherwise advised) at other times about the presence of undesirable locations and/or undesirable routes. However, the present arrangement allows the user to be provided with an accurate "last chance" warning or indication, so the user can fully appreciate the potential significance of an approaching junction.

In some cases, it will be practical to define a cut-off, beyond which a subsequent route is assumed to have "escaped" undesirable locations (i.e. the route is determined not to include an undesirable location). Branches of the route beyond the cut-off need not be considered, making the determination of step 815 simpler in cases where the road network is large. For example, in step 815, a subsequent route might be considered not to reach an undesirable location if the length of the route from the positioning device exceeds a certain distance, such as 3 km. Alternatively, a cut-off could be defined by a circle of a pre-determined radius (e.g. 5 km) centred on the positioning device, and the route considered not to reach an undesirable location if, along the route, an undesirable location is not reached within the radius of the circle. A cut-off could be defined in terms of the number of decision points that the subsequent route passes through. For example, if the subsequent route passes through more than 10 decision points without reaching an undesirable location. Preferably a combination of these is used, for example by requiring a subsequent route to have a minimum length and a minimum number of decision points before determining that an undesirable location is not reached. This would avoid a long road with no turn-offs being determined not to lead to an undesirable location simply because the length of the road exceeds the cut-off limit of the subsequent route length.

As noted in relation to FIG. 6, it is possible that only one onward route is considered, and steps 920 and 925 may be omitted.

Figure 10:
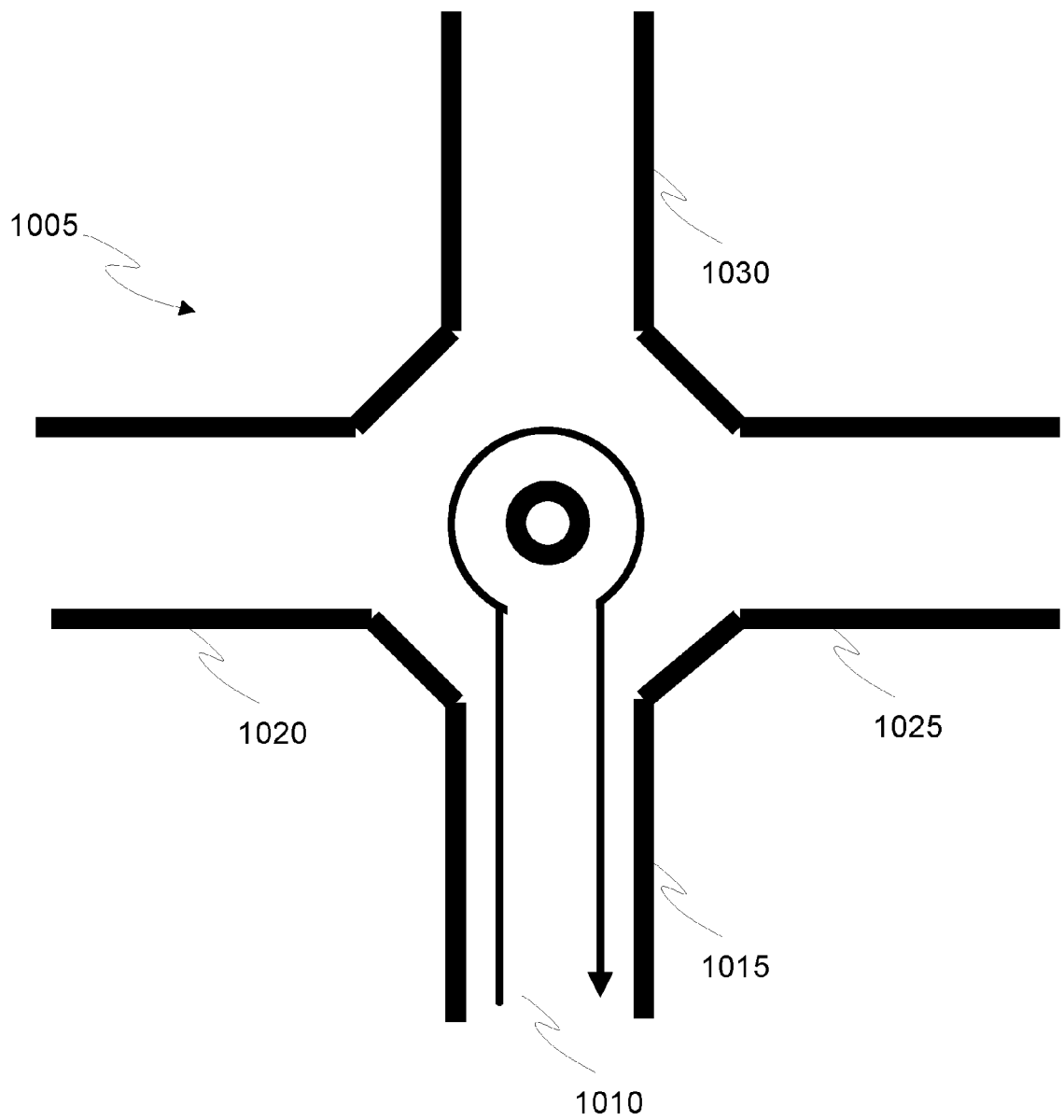
FIG. 10 illustrates an example of a route that merely reverse the user's direction.

In some cases a decision point may allow a user to exit along the route that the decision point was entered, but in the opposite direction. The example of a roundabout 1005 is shown in FIG. 10, where the route 1010 enters on road 1015 at the bottom of the figure travelling toward the top of the figure, completes an almost complete revolution about the roundabout and exits by the same road 1015. According to some variations of the above embodiments, the onward routes selected in step 815 exclude such routes, which merely reverse the user's direction. According to these variations it is possible to reduce the likelihood that a user will have to re-trace their route. For example, in FIG. 10, if roads 1020, 2025 and 1030 are all undesirable, the user would be warned of a last chance to avoid the undesirable area(s) before turning onto road 1015 (at a decision point off the bottom of FIG. 10). The user can then take another route on reaching this earlier decision point, rather than reaching roundabout 1005 before receiving a warning and having to return along road 1015. This reduces wasted time and fuel. By analogy, the processing section may omit from consideration in steps 815 any routes that cause a user to re-trace, or double back on, the same route, or complete a closed loop. Routes that lead only to dead-ends may also be excluded, unless the user is following a pre-set route to that location.

In some embodiments, when the user is following a planned route, step 815 may exclude any route that deviates from the planned route by a set margin. In this case, the "last chance" warning corresponds to the last chance to avoid the undesirable location(s) without significant deviation from the planned route. For example, in step 815 any onward route that (when extended to the final destination) leads to an excessive increase in travel distance or expected travel time is not considered. Excessive increase could be a pre-set value or could be a percentage of the planned journey distance/expected travel time. Similarly, in free driving routes could be excluded from step 815 if they are not in approximately the same direction as the current direction in which the user is travelling, or alternatively, the average direction from the start of the journey to the current location. In these embodiments, "onward route" is taken to require not only a route leading away from a decision point, but a route leading away from a decision point that agrees, within a pre-set measure, with a pre-planned route or current direction of travel.

The embodiments have been described in terms of undesirable routes and routes that are not undesirable. Routes could have a level of undesirability, indicated by a numerical value, for example. This value could reflect the cost of using a particular route. In some cases, such as a value may be assigned that indicates a maximum level of undesirability and that a route cannot be used. For example, when the positioning device is placed in a high vehicle, roads with insufficient overhead clearance must not be used, whereas a toll road may optionally be used. By assigning levels of undesirability, the information provided to the user can be tailored to better suit the situation.

Recommending Delay.

Conventional navigation devices minimise a cost function (or attempt to minimise a cost function) to select an optimal route. The cost function may reflect, for example, the length of the route, the time taken to follow the route, the likely fuel consumption associated with the route, or combinations of these. When route planning, known algorithms are used to find the "best" route suited to a user's needs. In order to evaluate the cost function, relevant information must be stored, such as length of each road, and/or speed of traffic on the road (e.g. from real-time information, or the speed limit, which allows an estimation of the typical speed). The information for evaluating the cost function may be time-dependent, such as in the case of live traffic flow information. However, in many cases the time-dependent information relates only to the current time, and does not permit reliable prediction of likely changes in the cost associated with a route. Herein cost refers to the value of the cost function for a route or portion of a route, and is not necessary associated with monetary cost.

With the proposals for road tax schemes in which a user is charged depending on the routes taken and the time at which the routes are used, there is potential for the pricing of a journey to become complex, and it will be difficult for users to determine the best route that balances their time and financial needs. Accordingly it is desirable to provide a device that can assist the user in this respect. Furthermore, the tax cost associated with a particular route at a particular time is expected to be well defined and capable of reliable prediction. This provides an opportunity, which is not currently fully exploited, to take advantage of predictable time-dependent data. At least some of these issues are addressed by the following embodiment.

Figure 13:
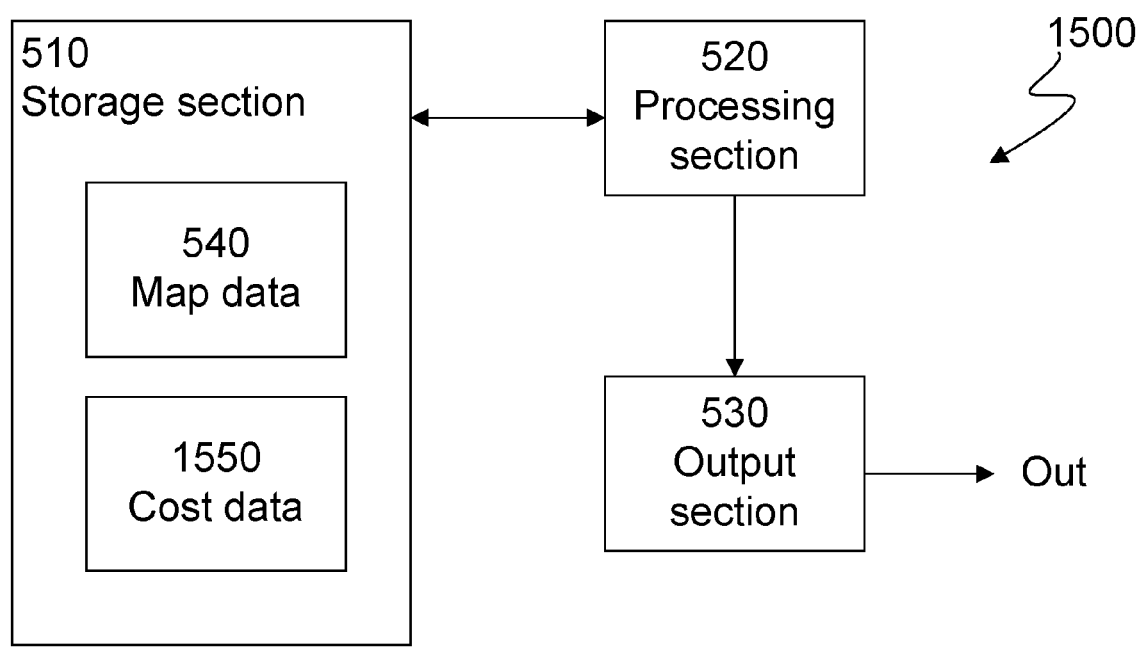
FIG. 13 shows a navigation device according to an embodiment of the present invention.

A navigation device of the present embodiment is shown in FIG. 13. The elements of FIG. 13 are similar to the correspondingly numbered elements in the embodiment of FIG. 5. In FIG. 13, time-dependent cost data 1550 is provided in the storage section 510. The cost data may be provided in addition to, or instead of avoidance data 550. As with the avoidance data 510, the time-dependent cost data 1550 maybe combined with the map data 540.

Figure 11:
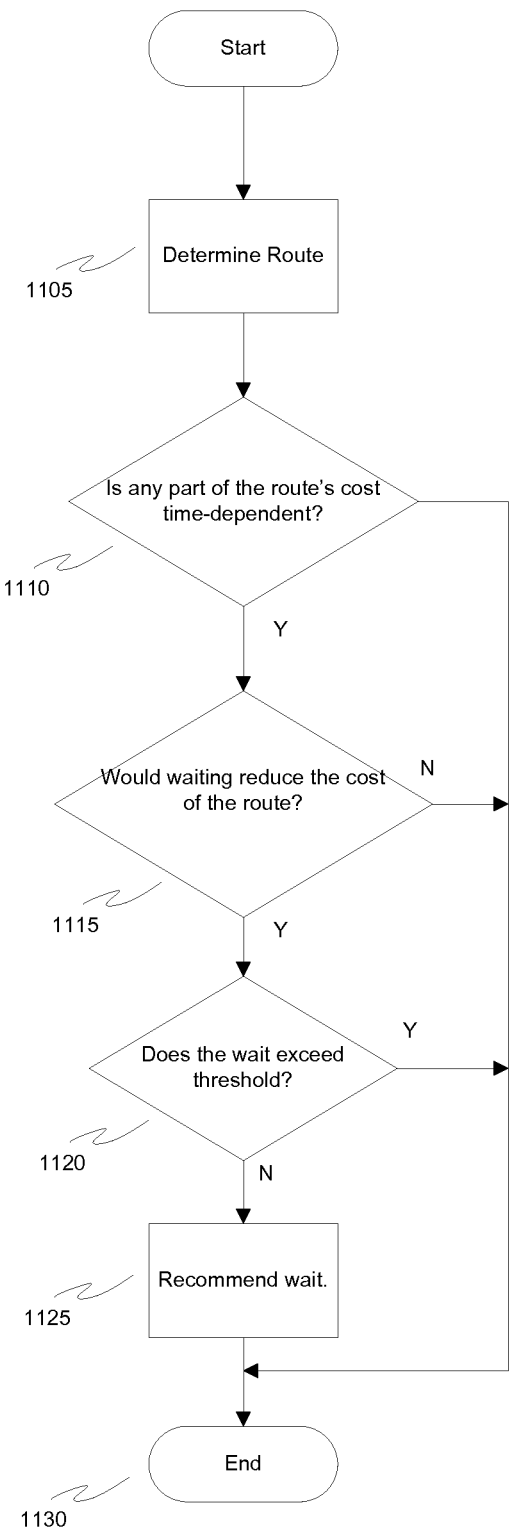
FIG. 11 illustrates a method performed by a navigation device according to another embodiment of the invention.

FIG. 11 shows a method performed by a processor in a navigation device. At step 1105 of FIG. 11, a route is determined. This could be calculation of a route before beginning a journey as in a conventional navigation device, where a start and end position are provided, and the route minimises the cost of the journey between the start and end points. The cost of a route is based on a given cost function, evaluated using the cost data provided in the storage section. Step 1105 could also be embodied by calculating (or recalculating) a route during a journey. Where no end position is given (e.g. when free driving) the calculated route of step 105 could be the route between the current position to the next decision point, or one of a selection of possible onward routes (e.g. routes extending to a cut-off, along the lines of the cut-off described above).

At step 1110, it is determined whether the route includes time-dependent contributions to the cost, as evaluated by the cost function. For example, if certain roads in the route are taxable only at peak times, the monetary cost of using these roads would vary with time (off-peak vs. on-peak). Where there are no time-dependent contributions, the method terminates at step 1130.

If the route includes time-dependent portions, step 1105 determines whether or not waiting would reduce the cost of the route (as evaluated by the cost function). If it is determined that waiting would not reduce the cost of the route the method terminates at step 1130.

If it is determined that waiting would reduce the cost of the route, the method proceeds to step 1120, where the wait necessary to achieve a reduction in the cost is compared with a threshold. If the required wait exceeds the threshold, the wait is determined to be too long, and the method terminates at step 1130. The threshold may be a fixed time (e.g. five minutes) or may depend on the expected journey time (such as 5% of the expected journey time). If the wait is determined not to be too long, the output section is instructed to provide an appropriate output at step 1125. Where the navigation device is a PND, this can take the form of an audible or visible prompt to the user, informing them that waiting is advantageous, and preferably providing directions to a suitable location to wait. On the other hand, where the navigation device is a server, the output would be in the form of information transmitted to a positioning device (or other device that requested the information), the transmitted information enabling the positioning device (or other device) to prompt the user.

In an alternative arrangement, whether the wait is excessive is considered in step 1115, and step 1120 is omitted. Step 1115 can be arranged to take account of a wait time by including a time component in the cost function. This would allow the waiting time to be offset against the gains in the cost function. For example in the case of a cost function based on taxation, but including a term relating to the journey time, the monetary benefit of waiting would be automatically weighted against the additional time spent waiting. An example of a cost function would be:

$$F=\Sigma(m+\alpha T)$$

Where F is the cost function, the summation is over the roads in the route (segments or portions of the route), m is the monetary cost of using a road at a particular time, and T is the expected travel time for that road (or portion of road). T may also be time-dependent, e.g. to account for slower traffic at peak times. T can also include any waiting time. $\alpha$ is a parameter to adjust the weighting between monetary cost and time.

The determination in step 1115 can be determined in various ways. In one example, the processor may determine, based on the cost data, whether a cost associated with a portion of the route would be reduced at a time later than the expected time of arrival at that portion of the route. The processor may consider only a range of times around the expected arrival time at the portion of the route. The range of times could be of a set duration (e.g. within 15 minutes of the expected arrival time), or could be based on the expected travel time. The restriction of step 1115 to a range of times may be instead of or in addition to the determination in step 1120.

In a preferred embodiment, step 1115 is performed by considering a wait as an alternative route. This allows the same or similar processing to be used to determine whether the cost can be reduced by waiting. In particular, where the cost function has a time component, advantages and disadvantages of waiting are compared using the same relative importance as the initial calculation of the route. Optionally, the cost function could be amended to reflect that waiting may be considered frustrating.

Figure 12A:
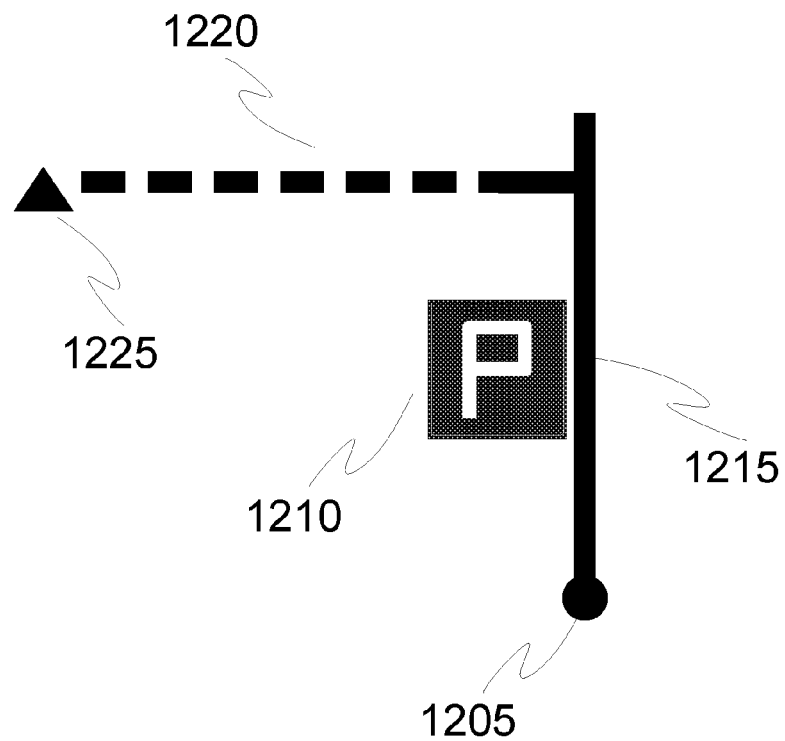
FIG. 12a shows an example road network for illustrating a method according to an embodiment of the invention.
Figure 12B:
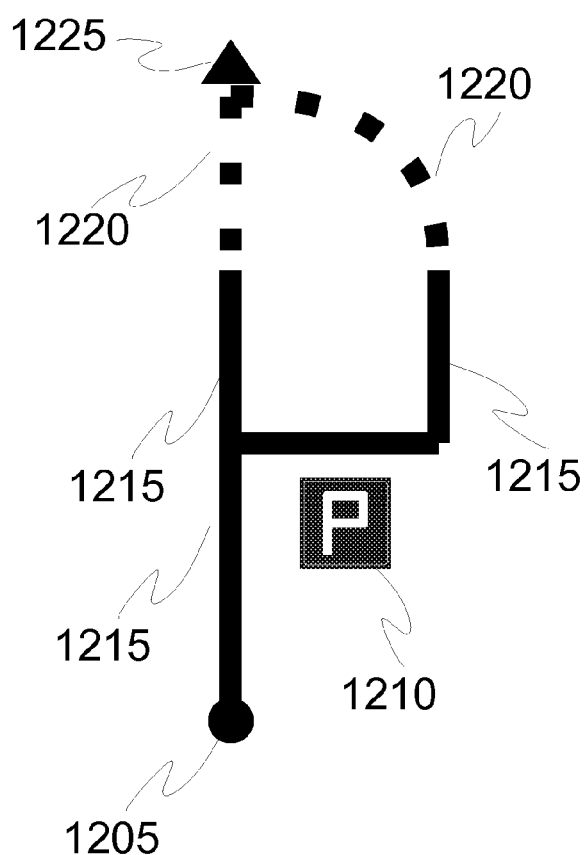
FIG. 12b illustrates possible routes in the road network of FIG. 12a, according to the method of FIG. 11.

FIG. 12*a* shows an example of a road network to illustrate the addition of alternative routes to represent waiting. In FIG. 12*a*, the user is travelling from point 1205 to destination 1225. The route uses road 1220, shown dashed, which has a monetary cost associated with it (e.g. road tax). However, a short time after the expected arrival at road 1220 the monetary cost of using this road is reduced. The processor, when calculating (or recalculating) the route replaces the single route along roads 1215 and 1220 with two notional routes, shown schematically in FIG. 12*b*. The road 1215 is initially followed for both routes, but before reaching the end of road 1215, the notional routes diverge. The route continuing straight in FIG. 12*b* represents continuing along roads 1215 and 1220 to destination 1225 without waiting. The other route represents stopping at parking place 1210 and waiting before continuing along roads 1215 and 1220. Along this route the monetary cost of using road 1220 is different, due to the time-dependent nature of the monetary cost in this case.

In some embodiments where the cost function is used to determine whether waiting is advantageous, step 1120 may be omitted. In some embodiments, step 1110 may be omitted, and the route recalculated from scratch with notional waiting routes included in the calculation. This allows for the possibility that a different route may become preferable, for example, if the user is delayed and the expected time of arriving at points along a route changes. The routes can be evaluated using a cost function, and the preferred route selected as normal. In cases where there are a number of portions of the route with time-dependent costs, the preferred route can be calculated taking into account the cumulative effects of waiting at various points, using standard route-planning algorithms.

In some embodiments the processor will determine whether waiting is likely to be possible and the output is adjusted accordingly. For example, if waiting on a motorway would be required, the suggestion to the user to wait would be suppressed, since it is not possible to stop on a motorway.

The process of FIG. 11 may be repeated where additional routes are to be considered, by selecting a different route at step 1105. For example, where the user is free driving, and no destination (end point) has been defined, all routes within a cut-off may be considered, and the user notified if the cost can be reduced on any of these routes by waiting.

In another embodiment, similar processing to that described above may be used to determine whether a cost associated with a portion of a route will increase shortly after the expected time that the portion will be arrived at by the user. "Shortly after" may be defined, for example as a pre-determined time period, or based on a percentage of the expected travel time between the start location, or current location, and the portion of the route. If it is determined that the cost will increase, the user may be advised. This will make the user aware that delays to the journey, such as taking a rest break or an unplanned diversion, may result in additional monetary costs or time delays (or other negative effects reflected by the cost function) for completing the route.

Herein references to "arriving" at a location, road or portion of a route could be replaced with the relevant time used to determine a cost associated with a route or portion of a route. In place of the expected arrival time, the expected time at which the route or portion will be left could be used, or both arrival and leaving time. This would depend on the time-dependent cost or costs for that route, and how they are evaluated.

In some embodiments, the cost function can be arranged to take into account monetary costs of waiting. For example, a user may provide the cost per mile of the vehicle, cost per minute of the driver, and cost per minute of waiting for a later departure, the navigation device could then optimise the cost for the trip, e.g. by determining the least expensive route and departure time.

It will be apparent from the foregoing that the teachings of the present invention provide a navigation device, which allows the user to more easily avoid undesirable locations and/or plan routes taking into account time-dependent factors.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device, comprising:
   a processor, memory, and map data stored within said memory; and
   an output section for providing an output responsive to the processor, the output section being an output device or a display device;
   the processor having access to map data and avoidance data, the avoidance data including information for identifying undesirable locations based on stored preference information, and
   the processor is arranged to, while a user is presently free driving on a route that is unknown to the navigation device, so the navigation device does not have information in advance about the route the user will follow, perform the following operations:
      receive location information representing a geographical location and direction of travel of the free driving in relation to the map data;
      establish, based on the location information and map data, that the geographical location and direction of travel of the free driving approach a navigation decision point having a plurality of onward routes leaving the navigation decision point that may be taken during the free driving;
      determine, based on the map data and avoidance data, that at least one onward route among the plurality of onward routes leaving the navigation decision point unavoidably includes an undesirable location, wherein the at least one onward route unavoidably includes the undesirable location when: (i) the undesirable location is reached before a next navigation decision point along the at least one onward route; or (ii) the undesirable location is not reached before a next navigation decision point along the at least one onward route, but all subsequent routes from the next navigation decision point along the at least one onward route unavoidably include an undesirable location;
      generate result information based at least in part on the determination; and
      output, to the user, via the output section, an indication that, at the next navigation decision point, the at least one onward route unavoidably includes the undesirable location, the indication including an identification of the at least one onward route from among the plurality of onward routes, and the indication being based at least on part on the result information.

2. The navigation device according to claim 1, wherein the processor performs the determination for each onward route from the navigation decision point.

3. The navigation device according to claim 1, wherein the avoidance data identifies as undesirable at least one of toll roads, taxable routes, a congestion charging zone, routes with height restrictions, routes with width restrictions and routes with weight restrictions.

4. The navigation device according to claim 1, wherein the navigation device is arranged to receive time data representative of at least one of a current time or an expected time at which the undesirable location will be reached, and wherein:
   the avoidance data is time-dependent, and
   the processor performs the determination based, at least in part, on the time data.

5. The navigation device according to claim 4, wherein the processing device investigates whether a degree to which the undesirable location is undesirable will change within a predetermined time period, and at least one of:
   a result of this investigation is used in the determination of whether the onward route unavoidably includes the undesirable location, and the result information includes the result of this investigation.

6. The navigation device according to claim 1, wherein at least one of: routes from a navigation decision point that re-trace an approach to a decision point; and routes from a navigation decision point that form a closed loop, are not considered by the processor to be onward routes from the decision point when performing the determination.

7. The navigation device according to claim 1, wherein the navigation device includes a positioning device, the positioning device arranged to determine the location information, the location information being representative of the geographical location and direction of travel of the positioning device.

8. The navigation device according to claim 1, wherein the navigation decision point is established as being approached when the navigation device is less than a pre-set distance from the navigation decision point.

9. The navigation device according to claim 8, wherein the pre-set distance is based on a road type associated with the navigation decision point.

10. The navigation device according to claim 8, wherein the warning is provided when the navigation device is less than a pre-set distance from the navigation decision point.

11. The navigation device according to claim 1, wherein the indication includes an identified type associated with the undesirable location.

12. The navigation device according to claim 1, wherein determining that all subsequent routes from the next navigation decision point unavoidably include the undesirable location comprises processing each subsequent route through a predetermined number of navigation decision points after the next navigation decision point to determine whether an undesirable location is reached on that subsequent route.

13. A machine-implemented navigation method comprising:
while a user is presently free driving on a route that is unknown to the navigation device, so the navigation device does not have information in advance about the route the user will follow, performing the following operations:
receiving location information representing a geographical location and direction of travel of the free driving;
establishing, based on the location information and map data including a plurality of navigation decision points, that the geographical location and direction of travel of the free driving approaches a navigation decision point having a plurality of onward routes leaving the navigation decision point;
accessing, by the machine, information for identifying undesirable locations based on stored preference information;
determining, by the machine, based on the information for identifying undesirable locations, that at least one onward route among the plurality of onward routes leaving the navigation decision point unavoidably includes an undesirable location, wherein the at least one onward route unavoidably includes the undesirable location when: (i) the undesirable location is reached before a next navigation decision point along the at least one onward route; or (ii) the undesirable location is not reached before a next navigation decision point along the at least one onward route, but all subsequent routes from the next navigation decision point along the at least one onward route unavoidably include an undesirable location;
providing, by the machine, result information responsive to the determination; and
outputting, via an output section of the machine, to the user, an indication that, at the next navigation decision point, the at least one onward route unavoidably includes the undesirable location, the indication including an identification of the at least one onward route from among the plurality of onward routes, and the indication being based at least on part on the result information.

14. The method according to claim 13, wherein the indication includes an identified type associated with the undesirable location.

15. A non-transitory computer-readable medium which stores a set of instructions which when executed performs a navigation method for, the method executed by the set of instructions comprising:
while a user is presently free driving on a route that is unknown to the navigation device, so the navigation device does not have information in advance about the route the user will follow, performing the following operations:
receiving location information representing a geographical location and direction of travel of the free driving;
establishing, based on the location information and map data including a plurality of navigation decision points, that the geographical location and direction of travel of the free driving approaches a navigation decision point having a plurality of onward routes leaving the navigation decision point;
accessing information for identifying undesirable locations based on stored preference information;
determining based on the information for identifying undesirable locations, that at least one onward route among the plurality of onward routes leaving the navigation decision point unavoidably includes an undesirable location, wherein the at least one onward route unavoidably include the undesirable location when: (i) the undesirable location is reached before a next navigation decision point along the at least one onward route; or (ii) the undesirable location is not reached before a next navigation decision point along the at least one onward route, but all subsequent routes from the next navigation decision point along the at least one onward route unavoidably include an undesirable location;
providing result information responsive to the determination; and
outputting, via an output section, to the user, an indication that, at the next navigation decision point, the at least one onward route unavoidably includes the undesirable location, the indication including an identification of the at least one onward route from among the plurality of onward routes, and the indication being based at least on part on the result information.

16. The computer-readable medium according to claim 15, wherein the indication includes an identified type associated with the undesirable location.

* * * * *